United States Patent
Mills et al.

(10) Patent No.: US 6,563,505 B1
(45) Date of Patent: *May 13, 2003

(54) METHOD AND APPARATUS FOR EXECUTING COMMANDS IN A GRAPHICS CONTROLLER CHIP

(75) Inventors: Karl Scott Mills, Lynnwood, WA (US); Richard Charles Andrew Owen, Seattle, WA (US); Mark Emil Bonnelycke, Seattle, WA (US)

(73) Assignee: Cirrus Logic, Inc., Austin, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1098 days.

(21) Appl. No.: 08/667,826

(22) Filed: Jun. 20, 1996

Related U.S. Application Data

(60) Provisional application No. 60/000,490, filed on Jun. 23, 1995.

(51) Int. Cl.[7] .................................................. G06F 9/00
(52) U.S. Cl. ........................................ 345/522; 345/520
(58) Field of Search ................................ 395/501, 502, 395/525, 526, 595, 522, 524; 345/521, 522, 524, 526, 501, 520, 502

(56) References Cited

U.S. PATENT DOCUMENTS

| | | | |
|---|---|---|---|
| 4,616,220 A | * | 10/1986 | Grunewald et al. ......... 345/510 |
| 4,811,007 A | | 3/1989 | Schreiber |
| 5,046,023 A | | 9/1991 | Katsura et al. |
| 5,142,621 A | * | 8/1992 | Gotta et al. .................. 395/520 |
| 5,243,447 A | | 9/1993 | Bodenkamp et al. |
| 5,249,266 A | * | 9/1993 | Dye et al. .................... 395/502 |
| 5,299,309 A | | 3/1994 | Kuo et al. |
| 5,321,806 A | * | 6/1994 | Meinerth et al. ........... 395/502 |
| 5,353,402 A | | 10/1994 | Lau |
| 5,357,614 A | * | 10/1994 | Pattisam et al. ............ 395/888 |
| 5,388,207 A | * | 2/1995 | Chia et al. ................... 395/525 |
| 5,404,445 A | * | 4/1995 | Matsumoto .................. 395/501 |
| 5,452,469 A | * | 9/1995 | Sone et al. .................. 395/595 |
| 5,596,767 A | * | 1/1997 | Guttag et al. ............... 395/501 |
| 5,675,750 A | * | 10/1997 | Matsumoto et al. ........ 345/309 |

OTHER PUBLICATIONS

Michael Slater, Intel Announces DVI Chip Set Nov. 28, 1990 p. 6–10.*

* cited by examiner

*Primary Examiner*—Cao H. Nguyen
(74) *Attorney, Agent, or Firm*—Robert P. Bell; Steven A. Lin; Naren Thappeta

(57) ABSTRACT

A graphics controller circuit for minimizing an amount of data received from a host. The graphics controller circuit includes a register file with a plurality of registers. The graphics controller accepts commands addressed to virtual registers, and generates plurality of instructions including an instruction to access one of the registers in the register file. By using such a virtual register number in a command and generating several instructions in response thereto, the graphics controller circuit of the present invention minimizes the amount of data host sends over the system bus.

22 Claims, 4 Drawing Sheets

METHOD AND APPARATUS FOR EXECUTING COMMANDS IN A GRAPHICS CONTROLLER CHIP

CROSS-REFERENCE TO RELATED APPLICATIONS

The present application claims priority from Provisional Application Ser. No. 60/000,490 entitled "Byte Enable FIFO Architecture" filed Jun. 23, 1995.

FIELD OF THE INVENTION

The present invention relates generally to computer graphics systems and more specifically to a method and apparatus for executing commands in a graphics controller chip.

BACKGROUND OF THE INVENTION

Graphics controllers are designed to receive commands and display data from a host system, and generate display signals from display data and commands to display video images on a display system. FIG. 1 is a block diagram of a computer system 100 comprising such graphics controller 120, host 110, and display unit 130.

Graphics controller 120 may receive commands and display data from host 110 over system bus 112, and execute commands in the process of generating display signals on display bus 123 to display a video image of display data on display unit 130. Graphics controller 120 may generate more display data while executing commands received from host 110. Display data may comprise, for example, text data or graphics/video data in an RGB format.

Graphics controller 120 may store display data in display memory 140 before generating corresponding display signals on display bus 123. Each element of display data stored in display memory 140 may correspond to a pixel on the display unit. Such a data element is hereinafter referred to as pixel datum, and a plurality of such pixels are referred to as pixel data.

Commands received from host 110 may specify operations such as a move display block operation which may indicate to graphics controller 120 to move a block of display (hereinafter referred to as source display block) from one area of display memory 140 to another area (destination display block) on display memory 140. In some cases, source display block may be located in host 110, in which case host 110 may send display data of source display block also over system bus 112. In response, graphics controller 120 may move pixel data of source display block to memory locations corresponding to destination display block in display memory 140.

Host 110 may send several commands to graphics controller 120 to perform each operation. For example, to perform a move display block operation, host 110 may send a command to specify X-Y coordinates of starting location of source display block, another command to specify X-extent (i.e. length of display block in X-direction relative to starting address) and Y-extent of source display block, and yet another command to specify X-Y coordinates of starting address of destination display block. Host 110 may finally send another command to begin moving display data to memory locations corresponding to destination display block in display memory 140.

With the advent of graphics intensive applications (usually referred to as Graphical User Interface or GUI), computer system 100 may need to execute several graphics operations within a short duration. For example, click of a mouse by a computer user may require computer system 100 to execute several graphics operations. As each operation may require execution of several commands, host 110 may send a correspondingly large number of commands to graphics controller 120 over system bus 112.

One problem with prior art computer system 100 is that system bus 112 may not have bandwidth to support transfer of such a large number of commands and display data, and may therefore become a performance bottleneck in computer system 100. Such performance bottleneck may hinder performance throughput of computer system 100.

The performance bottleneck in system bus 112 may further be exacerbated as host 110 and graphics controller 120 may be operating at a higher speed and a larger bus width compared to system bus 112. For example, host 110 comprising a Pentium (TM) processor may be operating at 75 Mhz clock speed and a 64-bit internal bus, graphics controller 120 may be operating at 62.5 Mhz clock speed and a 64-bit internal bus, while system bus 112 comprising a PCI bus may be operating at 33 Mhz clock speed and 32-bit wide bus. Such a difference in clock rates and bus-widths in combination with graphics operations intensive GUI applications may cause a data throughput bottleneck on system bus 112, and hinder performance of computer system 100.

SUMMARY AND OBJECTS OF THE INVENTION

A graphics controller circuit includes a host interface which may receive a command from the host, and generate a plurality of instructions from the command. An execution circuit executes the plurality of instructions to execute, in effect, the command received from the host.

The graphics controller circuit may further include a register file comprising a plurality of registers. The host interface may generate a first set of instructions if the command accesses a first register in the register file, and a second set of instructions if the command accesses a second register. The first set of instructions may comprise accessing the first register. The second register in the present invention may be a virtual register, and the second set of instructions may include an instruction to access the first register.

By having such commands which are directed to virtual registers, and generating multiple instructions including a command to access a register in the register file, the graphics controller of the present invention may allow an access command to a register to be combined with other commands into one command on the system bus. Since several commands may be combined into one command on the system bus, the amount of data transferred on the system bus may be minimized.

The host interface of the present invention may comprise a command encoder for examining data on the bus, and for determining whether the command is addressed to the first register or the second register. The commander encoder may generate the first set of instructions if the command is addressed to the first register, and may generate the second set of instructions if the command is addressed to the second register.

The host interface may also include a FIFO queue for storing instructions generated by the command encoder, and for providing the instructions to the execution block. As the host interface generates multiple instructions from each command, the graphics controller instruction path and host supplied data-path may operate at a smaller bus-width saving silicon space. Graphics controller may execute such increased number of instructions as the graphics controller may be operating at higher speed than the system bus.

In the present invention, a plurality of commands to perform a move display block operation may include host supplied data. The host may send host data and the plurality of commands for the move display block operation over the host bus. The command encoder may store the host data and a set of instructions corresponding to the plurality of commands in the FIFO queue comprising a plurality of entries. The command encoder may also generate a tag bit indicative of whether data stored in each entry comprises a host datum or an instruction.

A FIFO output control circuit in the graphics controller circuit may examine the tag bit of each entry, and forward data in the entry to the execution block if the tag bit indicates that data in the corresponding entry comprises instructions or to the pixel processing block if the tag bit indicates that data in the corresponding entry comprises host data.

DETAILED DESCRIPTION OF THE INVENTION

Figure 4:
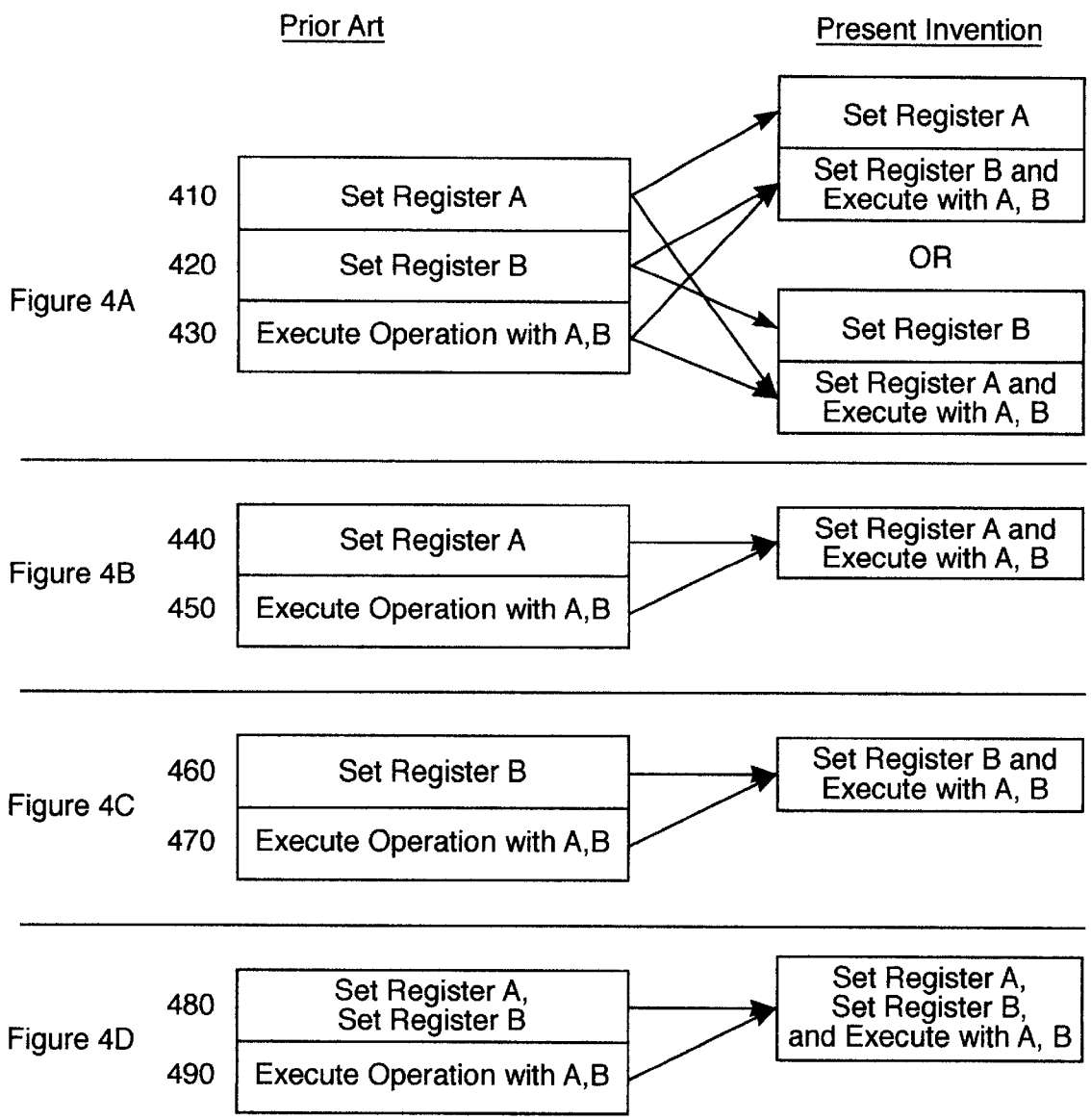
FIGS. 4A–4D illustrate difference between prior art and the present invention in the number of commands used to perform a graphics operation.

Graphics controller 120 of the present invention is designed to decrease number of commands received on system bus 112 as illustrated in FIGS. 4A–4D. As shown in FIG. 4A, to perform a graphics operation, host 110 in prior art may send three commands—a first command to set register A as shown in 410, a second command to set register B as shown in 420, and a third command to begin execution of an operation with A and B as shown in 430.

In the present invention, to perform an equivalent graphics operation, host 110 may send only two commands—one command to set register A as shown in 411, and another command to set register B and to begin execution with A and B as shown in 412. The present invention therefore allows three commands in the prior art to be combined into two commands. FIGS. 4B–4D are explained similar to FIG. 4A, i.e., two commands in the prior art are combined into one command.

For example, in the prior art, graphics controller 120 may receive four commands from host 110 to execute a move display block operation. A first command may specify an address of a source display block, a second command may specify an address of a destination display block, a third command may specify an X-extent and a Y-extent of a source display block, and a fourth command may instruct graphics controller 120 to begin execution with the parameters that may be set in first three commands. In response to the fourth command, graphics controller 120 may move pixel data of source display block (specified by first and third commands) to memory locations in display memory 140 that correspond to destination display block (specified by second command).

In the present invention, to perform a move display block operation, graphics controller 120 may receive only three commands from host 110. First and second commands may specify addresses of source and destination blocks as in prior art. However, a third command may specify X extent or Y extent or both, and also cause graphics controller 120 of the present invention to begin moving pixel data of source display block. As graphics controller 120 of the present invention may receive lesser number of commands to perform move display block operation, amount of data host 110 sends on system bus 112 may be reduced. Additionally, since virtual register space is used, additional physical registers are not required for such virtual register space, thereby saving additional silicon space.

Graphics controller 120 may achieve such reduction in amount of data transferred by having registers to store X, Y extents. Graphics controller 120 may accept one type of commands which store X, Y extents in the registers, and another type of commands directed to virtual registers. In response to such commands directed to virtual registers, a host interface 210 (shown in FIG. 2) may generate not only instructions which store X, Y extents in register, but also additional instructions. In the above example, in response to a command that accesses a virtual register, host interface 210 may generate multiple instructions to store X, Y extents in a corresponding register, and to begin moving pixel data of a source display block. Therefore, the third and fourth commands in the prior art may be combined into one command on system bus 112 in the present invention by using virtual registers.

As multiple commands used in the prior art may be combined into one command in the present invention, the amount of data on system bus 112 may be reduced. Although the present invention is explained with reference to a move display block operation, it will be appreciated that it is within the scope and spirit of the present invention to perform other types of operations.

Figure 1:
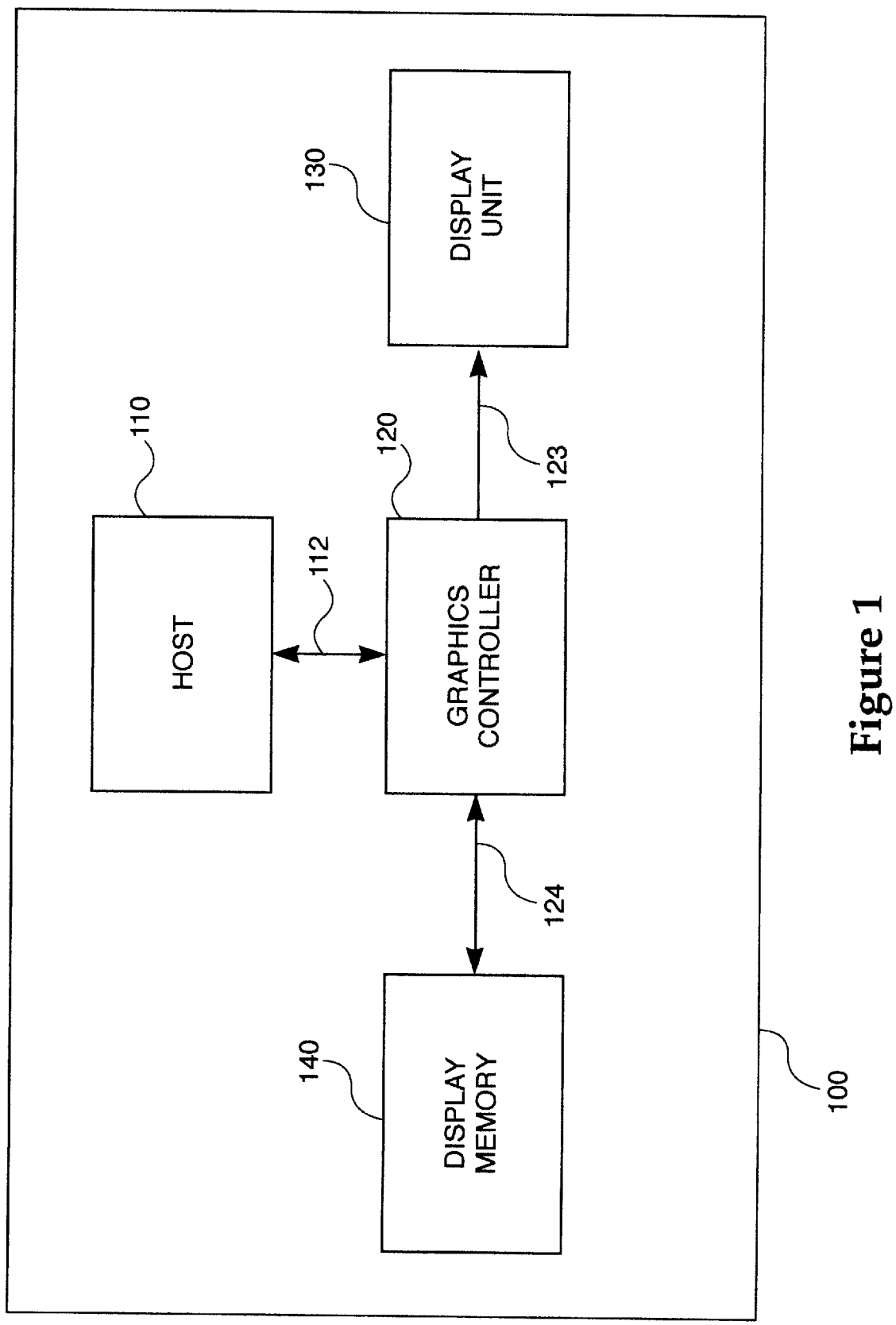
FIG. 1 is a block diagram of a computer system comprising a graphics controller, a host, a display memory, and a display unit.
Figure 2:
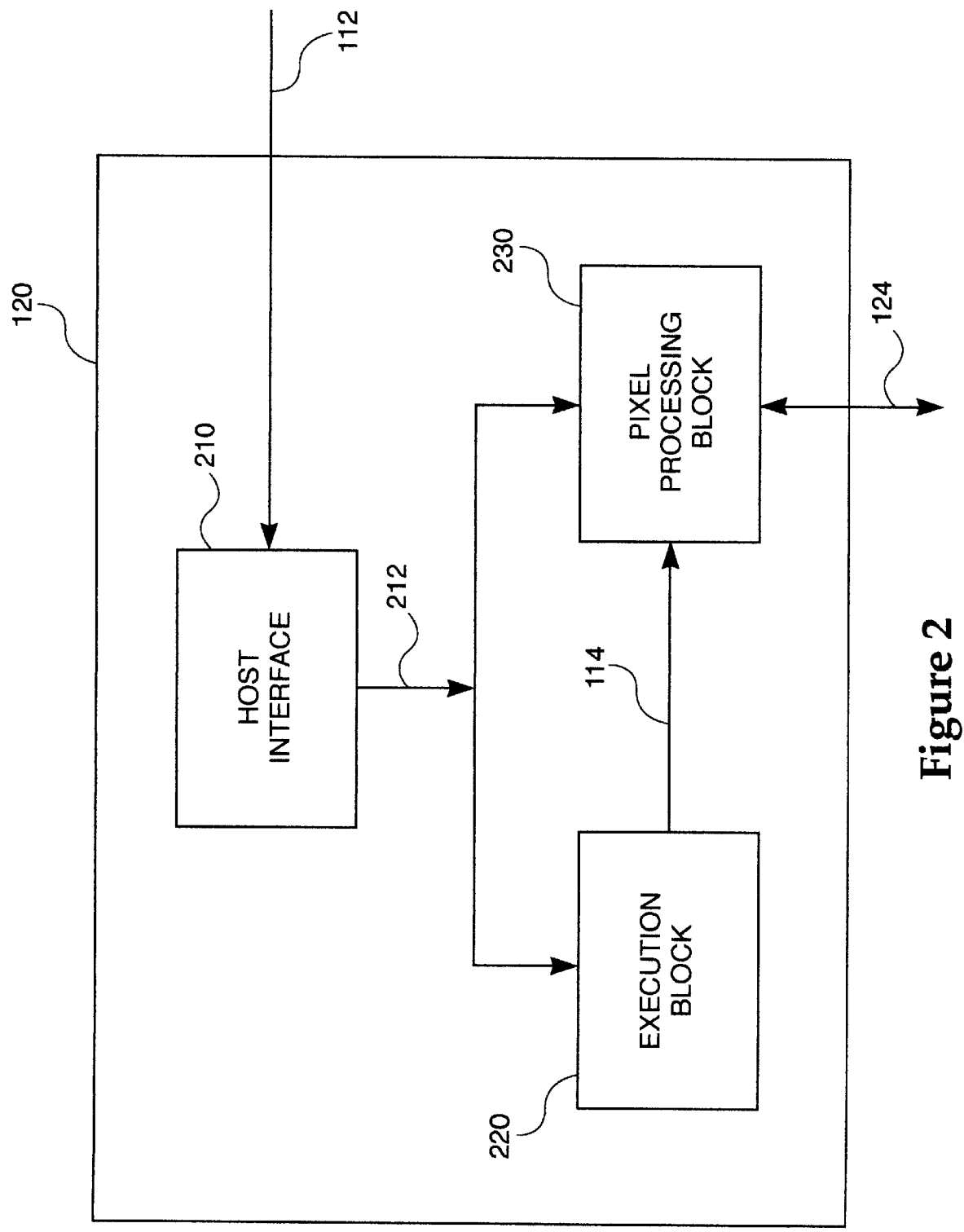
FIG. 2 is a block diagram of the graphics controller of the present invention comprising a host interface, an execution block and a pixel processing block.

FIG. 2 is a block diagram of graphics controller 120 of the present invention comprising host interface 210, execution block 220 and pixel processing block 230. Host interface 210 may receive commands and host data from host 110 over system bus 112, and generate multiple instructions corresponding to each command. By generating such multiple instructions corresponding to each command, graphics controller 120 may reduce the amount of data transferred from host 110 to graphics controller 120. Host interface 210 may receive commands at one clock rate (i.e. clock rate of system bus 112), and generate instructions at another rate (i.e. internal clock rate of graphics controller 120).

Execution block 220 may execute instructions generated by host interface 210 to perform operations specified by commands from host 110. Instructions executed by execution block 220 may include operations such as moving pixel data of a source display block to memory locations in display memory 140 corresponding to destination display block. Host 110 may send pixel data of a source display block over system bus 112 or host 110 may specify memory locations in display memory 140 where source display block pixel data are present. Execution block 220 controls the moving of pixel data from host 110 or from display memory 140 via control bus 114.

Pixel processing block 230 may process pixel data to generate additional pixel data. Such processing may include performing raster operations well known in the art. Pixel processing block 230 may store pixel data resulting from such processing in memory locations specified by execution block 220.

Figure 3:
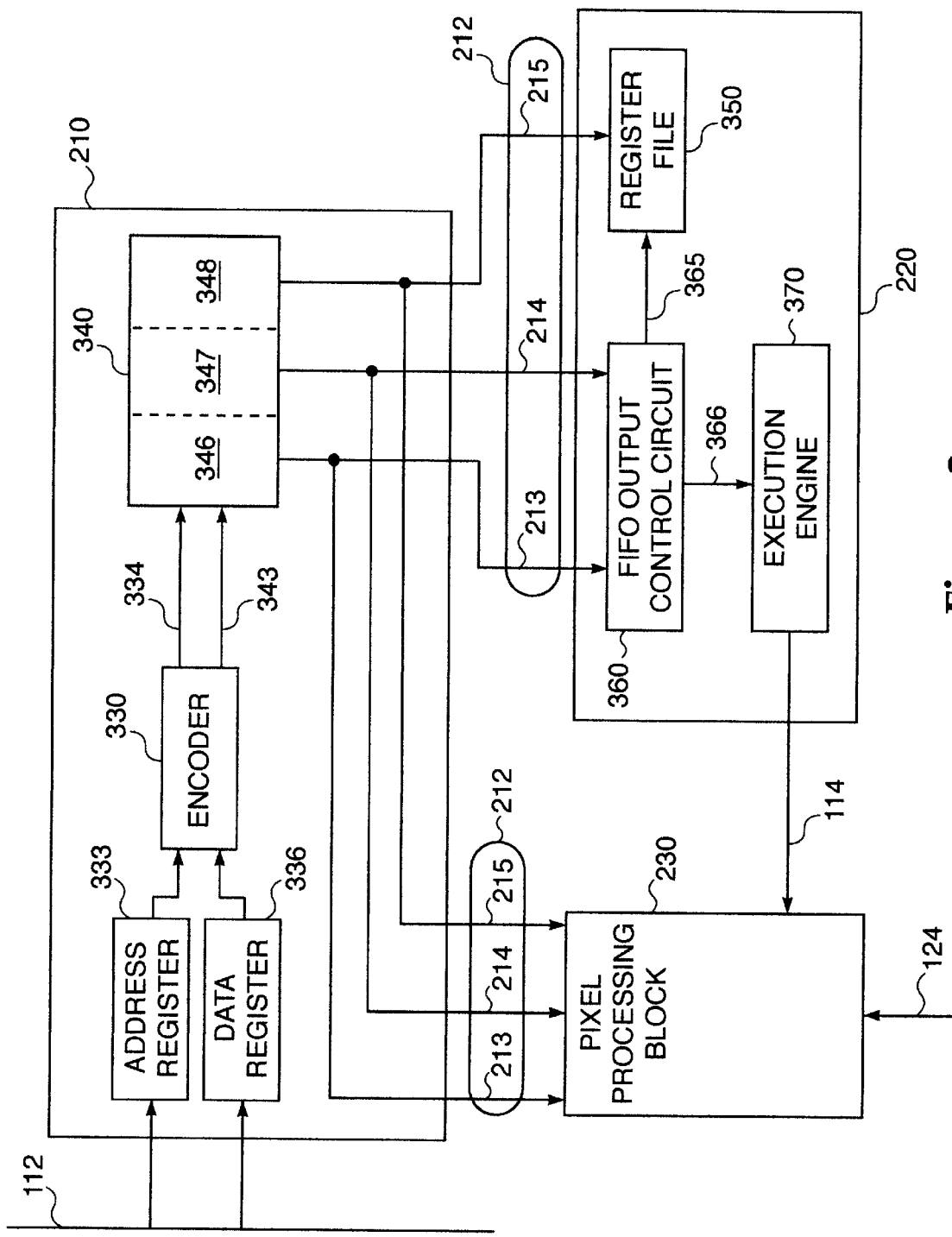
FIG. 3 is a block diagram illustrating a detailed architecture of the host interface and the execution block of the present invention.

FIG. 3 is a detailed block diagram of host interface 210 of the present invention comprising address register 333, data register 336, command encoder 330 and command/data FIFO 340. Encoder 330 of the present invention may generate multiple instructions from each of the commands received, and store the instructions in command/data FIFO 340.

FIG. 3 further includes a detailed block diagram of execution block 220 of the present invention comprising FIFO output control circuit 360, execution engine 370 and register file 350. FIFO output control circuit 360 may control when data is stored in register file 350. FIFO output control circuit 360 may also determine when to initiate execution of operations, and control the operation of execution engine 370 over bus 366. FIFO output control circuit 360 may perform each of its operations based on command/tag information received on buses 213 and 214 of command/data FIFO bus 212.

Register file 350 may comprise a plurality of registers each storing a value corresponding to a predetermined parameter. For example, registers 0 and 1 may store X, Y coordinates of a starting address of a source display block and destination display block, respectively, for a move display block operation. Register 2 may store X and Y extents of source display block. The registers in register file 350 may also be referred to as physical registers in the present application.

In a preferred embodiment, each register in register file 350 may comprise 32 bits with each of X, Y extents and X, Y coordinates being stored in 16 bits. Register file 350 may comprise multiple registers addressable as a memory mapped register set, i.e., each register may have a predetermined memory address. In a preferred embodiment, register file 350 may comprise eight registers.

Commands such as specifying starting addresses of source and destination display blocks may therefore entail writing data into corresponding register in register file 350. System bus 112 may comprise a 32-bit wide PCI bus, and host 110 may accordingly send 32-bit address information during one clock cycle (of system bus 112) and corresponding 32-bit data during a subsequent clock cycle to send a command.

For example, host 110 may send 32-bit memory address of register 0 during a clock cycle and corresponding data during subsequent clock cycle to set a start address of a source display block. 32-bit data may comprise 16-bits each for X and Y coordinates of a start address. Similarly, host 110 may send an address of register 2 and corresponding data to set X and Y extents of a source display block for a move operation.

Host 110 may also send memory address of a virtual register number (such as 8 when register file 350 includes only 8 registers numbered 0–7). In response to receiving such virtual register number, graphics controller 250 of the present invention may generate instructions to store data received in next clock cycle in one of a predetermined registers 0–7, and to move pixel data to memory locations corresponding to destination display block in display memory 140.

By using such virtual register addressing and generating instructions to store and move, graphics controller 120 may obviate the need for an additional command to begin moving pixel data, thereby decreasing amount of command data transferred over system bus 112. As will be appreciated, graphics controller 120 in the prior art may require such an additional command to begin moving pixel data to memory addresses of the destination display block. It will further be appreciated that different types of instructions may also be generated in response to such virtual register addressing without departing from scope and spirit of the present invention.

Continuing with reference to FIG. 3, address register 333 and data register 336 may respectively store address and data information received over system bus 112 during each bus cycle. Address from host 110 may comprise memory mapped address of registers in register file 350 or address of a virtual register.

Command encoder 330 may examine an address stored in address register 333 to generate corresponding instructions. For example, if an address corresponds to register 0, command encoder 330 may generate two instructions. The first instruction may store 16-bit Y coordinate of 32-bit data (stored in data register 336) in register 0, and the second instruction may store the remaining 16-bit X-component in register 0.

If the address stored in address register 333 corresponds to a virtual register, command register may generate additional instructions other than the store instructions. For example, in a preferred embodiment, graphics controller 120 may comprise three virtual registers (extent-execute-X, extent-execute-Y and extent-execute-X-Y registers) which may be used by host 110 while performing a move display block operation.

A write operation to extent-execute-X (register number 8) virtual register may indicate that only the X-extent needs to be changed, and move operation of the pixel data may immediately begin with the changed X-extent. In response to such extent-execute-X write operation, command encoder 330 may generate an instruction to change X-extent and another instruction to begin move operation of display data to address specified by register 1. Similarly, command encoder 330 may generate two instructions corresponding to a write operation to extent-execute-Y register.

Command encoder 330 may generate three instructions corresponding to a write command to extent-execute-X-Y virtual register (register number 10). First instruction may write 16-bit X-component of 32 bit data, and second instruction may write the remaining 16-bit Y-component of 32 bit data. Third instruction may be a move instruction to begin moving source display block pixel data to destination display block.

Each instruction generated by command encoder 330 may comprise 32 bits with 16 bits being used for one of X extent or Y extent or X coordinate or Y coordinate. The remaining 16 bits may specify an instruction code which may indicate the type of instruction (for example, store to register 1, or begin display data move operation). Command encoder 330 may send such 32-bit instructions over instruction/data bus 334.

Command encoder 330 may also send a tag bit on signal line 343 to indicate whether information sent on instruction/data bus 334 corresponds to an instruction or host datum. Command encoder 330 may send a logical value of 0 for the tag bit while sending instructions over instruction/data bus 334, and a logical value of 1 while sending host datum.

Such host data may be received from host 110 over system bus 112, and may correspond to pixel data of source display block. Register 0 may have a value indicating that pixel data for a source display block may be provided by host 110, in which case host 110 may send the pixel data of the source display block for the move display block operation.

Command/data FIFO 340 may store each instruction or host datum received over instruction/data bus 334, and corresponding tag bit received over signal line 343. Command/data FIFO 340 may comprise 32 entries in a preferred embodiment with each entry including 33 bits. Each entry may store 32 bits of instruction or host datum, and the corresponding tag bit. Each tag bit (stored in tag bit field 346) in command/data FIFO 340 may indicate whether corresponding 32 bits represent an instruction or host datum.

If 33 bits in an entry of command/data FIFO 340 represent an instruction, instruction code field 347 may store 16 bits corresponding to an instruction code, and data field 348 may store the remaining 16 bits corresponding to data portion of the instruction. If 33 bits in an entry in command/data FIFO 340 represent host data, command/data FIFO 340 may store 32 bits of host data in the entry using data fields 347 and 348. If host data is supplied, it will be processed by pixel processing block 230 via bus 212 as indicated by tag bit on bus 213.

It will be appreciated that by generating multiple instructions from a single command, command/data FIFO 340 of the present invention may advantageously operate at lesser data width (33 bits) than system bus 112. Without generating such multiple instructions, command/data FIFO may have to operate at 64-bit data width. Graphics controller 120 may be capable of executing the resulting increased number of instructions as graphics controller 120 may be operating at higher clock rate than system bus 112. For example, system bus 112 comprising a PCI bus may be operating at 33 Mhz while graphics controller 120 may be operating at 62.5 Mhz.

Continuing with reference to FIG. 3, FIFO output control circuit 360 may retrieve 33-bit data in each entry of command/data FIFO 340, and examine tag bit 346 to determine whether retrieved data corresponds to an instruction or host data. If 33 bits entry represent an instruction, FIFO output control circuit 360 may examine instruction code (stored in field 347) to determine whether the instruction is an instruction to store data into a register in register file 350. If so, FIFO output control circuit 360 may generate assert signal line 365 to store 16 bits in data field 348 in a register indicated by instruction code.

If a 33 bit entry represents an execution instruction, FIFO output control circuit 360 may initiate execution via execution engine 370 on control bus 366. Execution engine 370 may generate control signals to pixel processing block 230 to appropriately process host data. For example, host data may correspond to pixel data of a preceding move display block command, in which case execution engine 370 may store the pixel data in memory locations indicated by registers in register file 350. Graphics controller 120 may generate display signals to display unit 130 from the pixel data stored in display memory 140.

Hence, host interface 210 of the present invention may generate multiple instructions from each command received from host 110, which may reduce amount of data host 110 sends to graphics controller 120. Generating such multiple instructions may also enable graphics controller 120 to advantageously operate at lower bus-widths.

Although the present invention is explained with reference to display block move operation, other types of operations may be performed without departing from the scope and spirit of the present invention. For example, one may generate multiple instructions upon a read access to a register. Such register may be virtual as in above description or physically present (for example one of registers 0-7 in register file 350). Read and write commands are together hereinafter referred to as access commands.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

What is claimed is:

1. A graphics controller circuit for use in a computer system, the computer system comprising a bus and a host, the host being coupled to the bus, comprising:
   a host interface for receiving a single command on the bus from the host, and generating a plurality of instructions in response to the command, at least one of the plurality of instructions comprising a set register instruction, and at least another of the plurality of instructions being an execute instruction; and
   an execution circuit, coupled to the host interface, for executing the plurality of instructions to execute the command.

2. The graphics controller circuit of claim 1 further comprising:
   a register file comprising a plurality of registers,
   wherein the host interface generates a first set of instructions if the command accesses a first register in the register file, and a second set of instructions if the command accesses a second register, wherein a number of instructions in the first set of instructions is different from a number of instructions in the second set of instructions, and wherein the first set of instructions comprises accessing the first register.

3. The graphics controller circuit of claim 2 wherein the second register comprises a virtual register, and wherein the second set of instructions comprises at least an instruction to access the first register.

4. The graphics controller circuit of claim 3 wherein the host interface comprises:
   a command encoder coupled to the system bus for examining data on system, and for determining whether the command is addressed to the first register or the second register, the commander encoder generating the first set of instructions if the command is addressed to the first register and generating the second set of instructions if the command is addressed to the second register; and
   a FIFO queue for storing the instructions generated by the command encoder, and for providing the instructions to the execution block.

5. The graphics controller circuit of claim 4 wherein the command is comprised in a plurality of commands for a move display block operation, and wherein the host sends host data and the plurality of commands for the move display block operation over the host bus.

6. The graphics controller circuit of claim 5 wherein the command encoder stores the host data and a set of instructions corresponding to the plurality of commands in the FIFO queue comprising a plurality of entries, and wherein the command encoder generates a tag bit indicative of whether data stored in each entry comprises a host datum or an instruction.

7. The graphics controller circuit of claim 6 further comprising a FIFO output control circuit for examining the tag bit of each entry and forwarding data in the entry to the execution block if the tag bit indicates that data in the corresponding entry comprises host data.

8. A computer system comprising:
   a host for sending pixel data and a combined command for setting a register and executing a graphics instruction over a bus;

a display unit;

a display memory for storing a set of pixel data corresponding to a display image on the display unit; and a graphics controller circuit for providing the set of pixel data to the display memory, said graphics controller circuit comprising:

a host interface for receiving the combined command and the pixel data on the bus from the host, the host interface generating a plurality of instructions in response to the combined command, at least one of the plurality of instructions comprising a set register instruction, and at least another of the plurality of instructions being an execute instruction; and an execution circuit, coupled to the host interface, for executing the plurality of instructions to store pixel data in the display memory and to execute the combined command 9. The computer system of claim 8 wherein the graphics controller circuit further comprises:

a register file comprising a plurality of registers, wherein the host interface generates a first set of instructions if a command accesses a first register in the register file, and a second set of instructions if the command accesses a second register, wherein number of instructions in the first set of instructions is different from number of instructions in the second set of instructions, and wherein the first set of instructions comprises accessing the first register.

10. The computer system of claim 9 wherein the second register comprises a virtual register, and wherein the second set of instructions comprises at least an instruction to access the first register.

11. The computer system of claim 10 wherein the host interface comprises:

a command encoder coupled to the system bus for examining data on system, and for determining whether the command is addressed to the first register or the second register, the commander encoder generating the first set of instructions if the command is addressed to the first register and generating the second set of instructions if the command is addressed to the second register; and a FIFO queue for storing the instructions generated by the command encoder, and for providing the instructions to the execution block.

12. The computer system of claim 11 wherein the combined command is designed to perform a move display block operation.

13. The computer system of claim 12 wherein the command encoder stores host data and a set of instructions corresponding to the combined command in the FIFO queue comprising a plurality of entries, and wherein the command encoder generates a tag bit indicative of whether data stored in each entry comprises a pixel datum or an instruction.

14. The computer system of claim 13 further comprising a FIFO output control circuit for examining the tag bit of each entry and forwarding data in the entry to the execution block if the tag bit indicates that data in the corresponding entry comprises pixel datum.

15. A graphics controller circuit comprising:

a physical register addressable as a memory location for storing a parameter for a graphics operation;

an encoder for receiving a first command accessing the physical register and a second command accessing a virtual register, the encoder generating a first set of instructions in response to the first command, and a second set of instructions in response to the second command, wherein the first set of instructions comprise an instruction to access the physical register, and wherein the second set of instructions comprises the first set of instructions and an instruction to execute a command;

a FIFO to store the first set of instructions and the second set of instructions; and a FIFO output control circuit coupled to the physical register and the FIFO, the FIFO output control circuit generating a control signal to access the physical register in response to the instruction to access the physical register.

16. A method of executing a command from a host processor in a graphics controller chip, comprising the steps of:

receiving, in a host interface, a command on the bus from the host processor, generating a plurality of instructions in response to the command, at least one of the plurality of instructions comprising a set register instruction, and at least another of the plurality of instructions being an execute instruction, storing the plurality of instructions in a command queue, and executing the plurality of instructions in the command queue to execute the command.

17. The method of claim 16 further comprising the step of:

examining the command to determine whether the command accesses a physical register or a virtual register, and wherein the step of generating a plurality of instructions further comprises the step of generating a first set of instructions if the command accesses the physical register, and a second set of instructions if the command accesses the virtual register, wherein both the first set of instructions and the second set of instructions comprise an instruction to access the physical register, and wherein the second set of instructions comprises the first set of instructions.

18. A graphics controller circuit for use in a computer system, the computer system comprising a bus and a host, the host being coupled to the bus, the graphics controller circuit comprising:

a host interface for receiving commands on the bus from the host, each command comprising a register address and data, and generating a plurality of instructions in response to each command; and an execution circuit, coupled to the host interface, for receiving the at least one instruction and executing the at least one instruction to execute the command, said execution circuit including a register file comprising a plurality of physical registers;

wherein the host interface generates a first plurality of instructions for accessing a physical register if the register address of a command is that of a physical register in the register file, and generates a second plurality of instructions for accessing a physical register and executing a command if the register address of a command is that of a virtual register.

19. The graphics controller circuit of claim 18 wherein the host interface comprises:

a command encoder coupled to the system bus for examining received commands and for determining whether a command is addressed to a physical register or a virtual register, the commander encoder generating the first plurality of instructions if the command is addressed to a physical register and generating the second plurality of instructions if the command is addressed to a virtual register; and a FIFO queue for storing the instructions generated by the command encoder, and for providing the instructions to the execution block.

20. A computer system comprising:

a host for sending pixel data and a combined command for setting a register and executing a graphics instruction over a bus;

a display unit;

a display memory for storing a set of pixel data corresponding to a display image on the display unit; and a graphics controller circuit for providing the set of pixel data to the display memory, said graphics controller circuit comprising:

a host interface for receiving the combined command and the pixel data on the bus from the host, the combined command and pixel data including a register address, the host interface generating a plurality of instructions in response to the combined command; and an execution circuit, coupled to the host interface, for receiving the plurality of instructions and executing the plurality of instructions to store pixel data in a physical register in a register file in the execution circuit and execute the command;

wherein the host interface generates a first plurality of instructions for accessing a physical register if the register address of a command is that of a physical register in the register file, and generates a second plurality of instructions for accessing a physical register and executing a command if the register address of a command is that of a virtual register.

21. The computer system of claim 20 wherein the host interface comprises:

a command encoder coupled to the system bus for received commands and for determining whether the command is addressed to a physical register or a virtual register, the commander encoder generating the first plurality of instructions if the command is addressed to a physical register and generating the second plurality of instructions if the command is addressed to a virtual register; and a FIFO queue for storing the instructions generated by the command encoder, and for providing the instructions to the execution block.

22. A method of executing a command from a host processor in a graphics controller chip, comprising the steps of:

receiving, in a host interface, a command on the bus from the host processor, examining the command to determine whether the command accesses a physical register or a virtual register, generating a first set of instructions in response to the command if the command accesses the physical register, and generating a second set of instructions in response to the command if the command accesses the virtual register, wherein both the first set of instructions and the second set of instructions comprise an instruction to access the physical register, and wherein the second set of instructions comprises the first set of instructions, storing the plurality of instructions in a command queue, and executing the plurality of instructions in the command queue to execute the command.

* * * * *